(12) United States Patent
Mortenson

(10) Patent No.: US 11,564,528 B1
(45) Date of Patent: Jan. 31, 2023

(54) CONTROL DEVICE FOR AN OUTDOOR COOKING ASSEMBLY

(71) Applicant: Douglas J Mortenson, Alma, WI (US)

(72) Inventor: Douglas J Mortenson, Alma, WI (US)

( * ) Notice: Subject to any disclaimer, the term of this patent is extended or adjusted under 35 U.S.C. 154(b) by 0 days.

(21) Appl. No.: 17/476,815

(22) Filed: Sep. 16, 2021

(51) Int. Cl.
*A47J 33/00* (2006.01)
*A47J 37/07* (2006.01)
*A23L 5/10* (2016.01)

(52) U.S. Cl.
CPC ............. *A47J 37/0745* (2013.01); *A23L 5/15* (2016.08); *A47J 33/00* (2013.01); *A47J 37/0786* (2013.01); *A47J 2037/0777* (2013.01); *A47J 2037/0795* (2013.01)

(58) Field of Classification Search
CPC .. A47J 37/043; A47J 37/0745; A47J 37/0763; A47J 37/0772; A47J 37/0786; A47J 33/00; A47J 2037/0777; A47J 2037/0795; A23L 5/15
USPC ............ 99/421 HV, 421 HH, 421 H, 421 M; 126/25 A, 25 R, 26, 27, 29, 30
See application file for complete search history.

(56) References Cited

U.S. PATENT DOCUMENTS

| | | | | |
|---|---|---|---|---|
| 3,359,888 A | * | 12/1967 | Deege ................. | A47J 37/0745 99/421 HV |
| 4,269,164 A | * | 5/1981 | Van Grinsven ..... | A47J 37/0763 126/30 |
| 5,025,715 A | * | 6/1991 | Sir ......................... | A47J 33/00 126/30 |
| 5,297,534 A | * | 3/1994 | Louden ............... | A47J 37/0763 126/30 |
| 5,908,026 A | * | 6/1999 | Forst ................... | A47J 37/0745 126/30 |
| 7,063,006 B1 | | 6/2006 | Spehle et al. | |
| 7,707,928 B1 | * | 5/2010 | Kamps ................. | A47J 37/043 126/30 |
| 9,763,539 B2 | | 9/2017 | Robles | |
| 10,517,428 B2 | | 12/2019 | Marlett | |
| 2008/0271725 A1 | | 11/2008 | Parmelee | |

* cited by examiner

*Primary Examiner* — Hung D Nguyen

(74) *Attorney, Agent, or Firm* — Mitchell Hamline IP Clinic

(57) ABSTRACT

A control system for use with an outdoor cooking apparatus may include a hub and an axle housing adapted to slidably couple with a hub. The control system may also include a motor mounted at or near the upper end of the axle housing and an axle mechanically coupled to the motor and extending through the axle housing to a free end emerging from the lower end of the axle housing. The control system may also include a support coupling attached to the free end of the axle, the support coupling being adapted to support a food support below the axle housing. The axle housing may be selectively arranged and secured relative to the sleeve to position the height of the support coupling relative to the lower end of the axle housing and the axle may rotate about its longitudinal axis when the motor is turned on.

18 Claims, 15 Drawing Sheets

CONTROL DEVICE FOR AN OUTDOOR COOKING ASSEMBLY

TECHNICAL FIELD

This disclosure relates to a system for suspending food over a heat source. More particularly, this disclosure relates to a rotatable grate, skillet, platform, or other food support adapted for cooking food over a heat source. Still more particularly, the present disclosure relates to a powered rotating food support that may be suspended from a tripod and is adjustable over a range of heights relative to a heat source or, in particular, an open fire.

BACKGROUND

Tripods for cooking food over a campfire may include a frame arranged over the campfire. A cooking grate may be provided that is suspended from the frame by a chain or series of chains. These systems have a host of problems. For example, adjusting the height of the grate above the fire may be relatively cumbersome and difficult because it may involve unhooking and/or hooking particular links of the chain from a hook above a hot fire. Moreover, the suspended nature of the chain may cause the grate to move, tip, or inadvertently rotate when attempting to turn or otherwise adjust the food. Still further, there may be little to know control over the rotation of the grate during the cooking process.

DETAILED DESCRIPTION

The present application, in one or more embodiments, relates to a control system adapted to improve tripod-type campfire grills. The system, in one or more embodiments, may include a rotatable and adjustable system that is adapted to sit atop a series of tripod legs and support a campfire grill. The system may allow for adapting the tripod campfire grill and may provide motorized rotation of the grill while also providing for better stability of the grate and simpler adjustment of the height of the grate relative to the campfire over which the tripod is arranged. The adjustment may be made while the motorized rotation of the grate is on and without resorting to the use of temperature-resistant hand protection. The system may be provided as a full system or as a retrofit for existing tripod grill systems. The system may provide for simple assembly, simple use, and simple adjustment and may alleviate many of the issues that exist with known tripod campfire grill systems.

Figure 1:
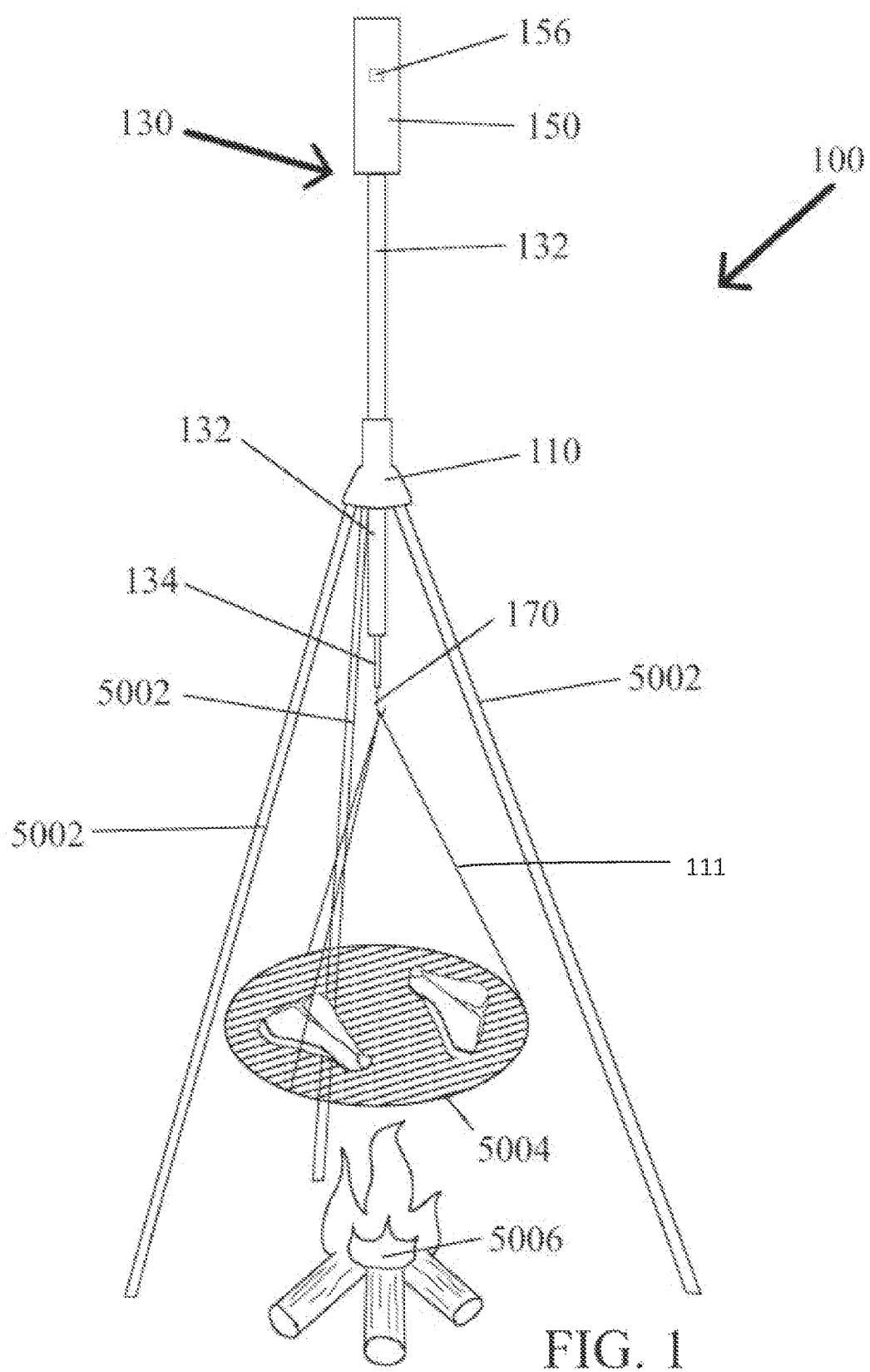
FIG. 1 is a perspective view of a control system assembled with a tripod frame and cooking apparatus, according to one or more examples.

FIG. 1 shows an embodiment of the control system 100 in operation with a tripod system over a heat source 5006, in particular, a campfire. As shown, the control system 100 may be arranged over a heat source 5006 by assembly with a plurality of legs 5002, such as, for example, three legs. A food support 5004 or grate adapted for cooking food over the heat source 5006 may be coupled with the control system 100, suspended below the control system 100, and may be used to cook food over the heat source 5006. The grate may be suspended by three equal lengths of chain, for example. It is to be appreciated, that tripod grill systems may include the plurality of legs 5002, a top coupling plate, a grate or food support 5004, and a chain system for suspending the grate from the top coupling plate. As shown, the present control system 100 may take the place of the top coupling plate and, as such, may be an aftermarket product, for example, that may be used with tripod grill systems by replacing the top coupling plate with the system 100. Alternatively, the system 100 may be manufactured and sold together with the other pieces of the tripod grill system and sold as a complete package.

Figure 2:
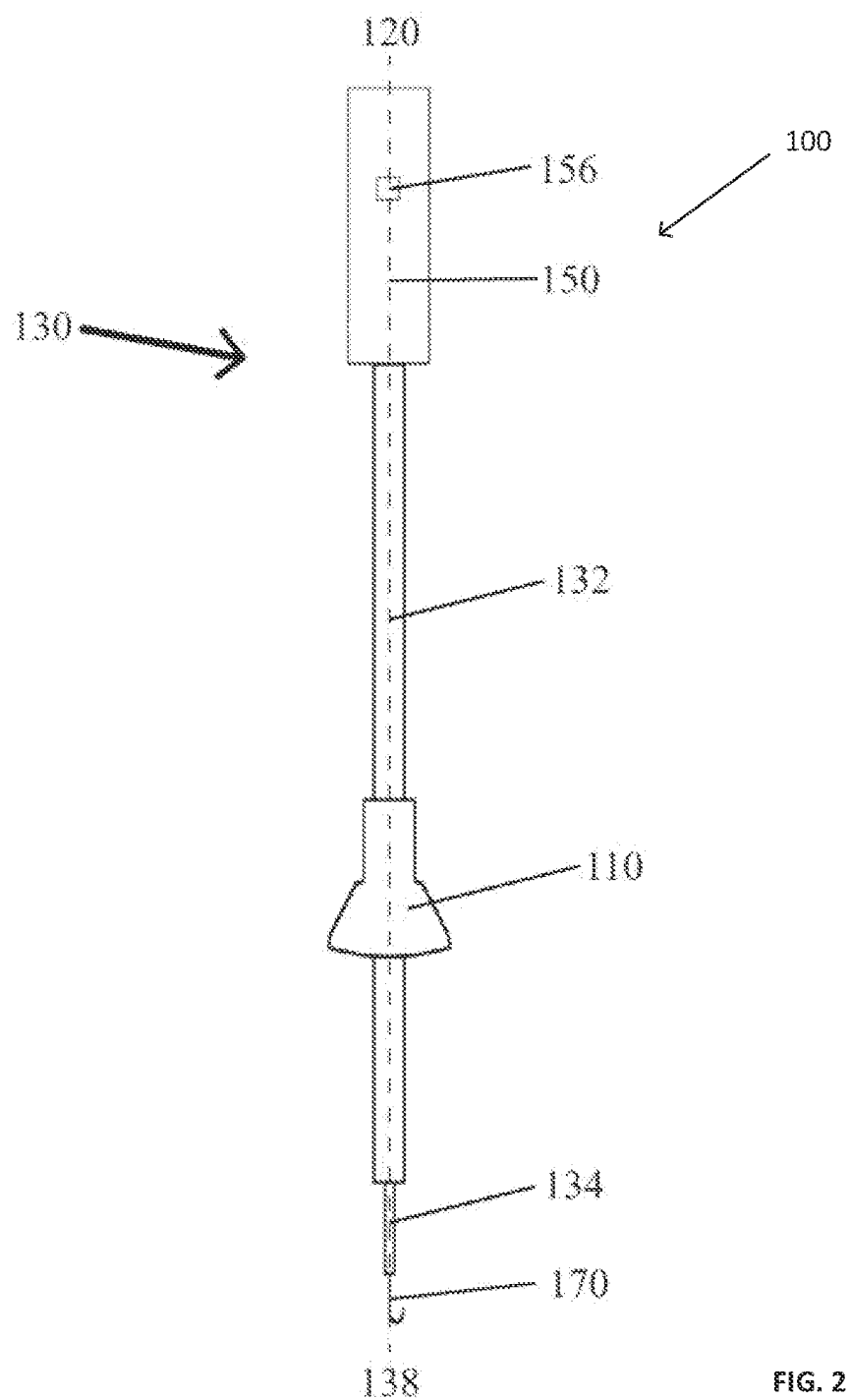
FIG. 2 is a perspective view of the control system of FIG. 1, according to one or more embodiments.
Figure 3:
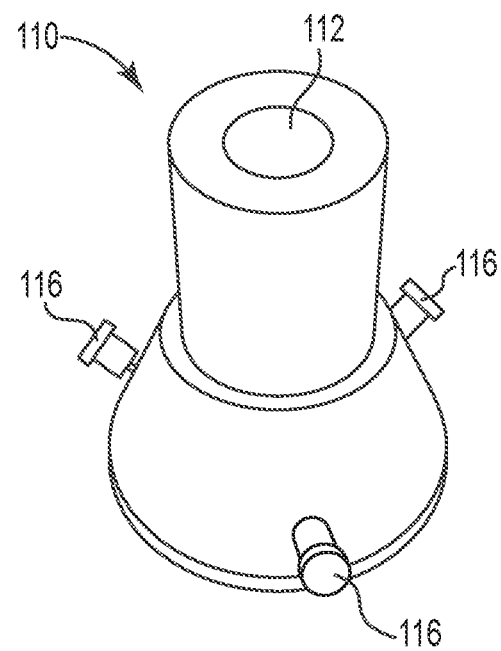
FIG. 3 is a perspective view of a hub of the control system of FIGS. 1 and 2, according to one or more examples.
Figure 4:
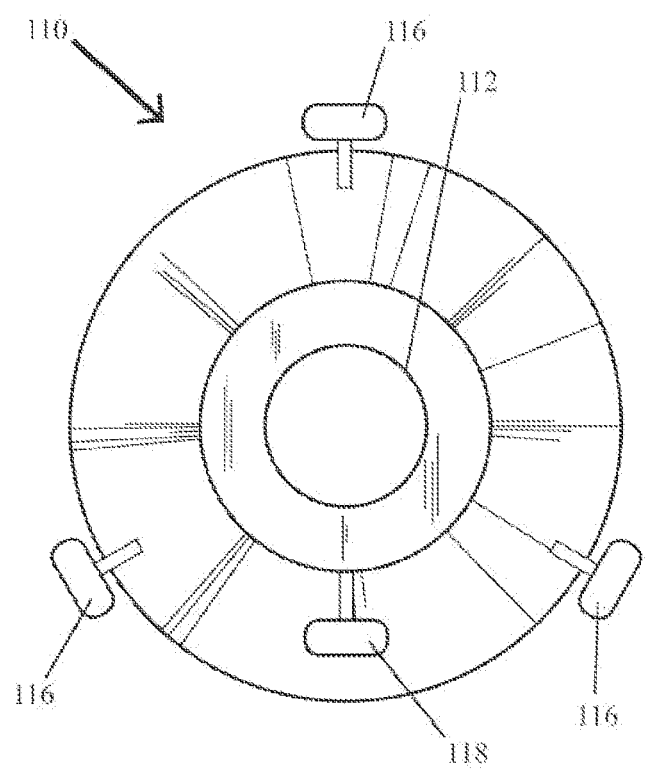
FIG. 4 is a top view thereof.
Figure 5:
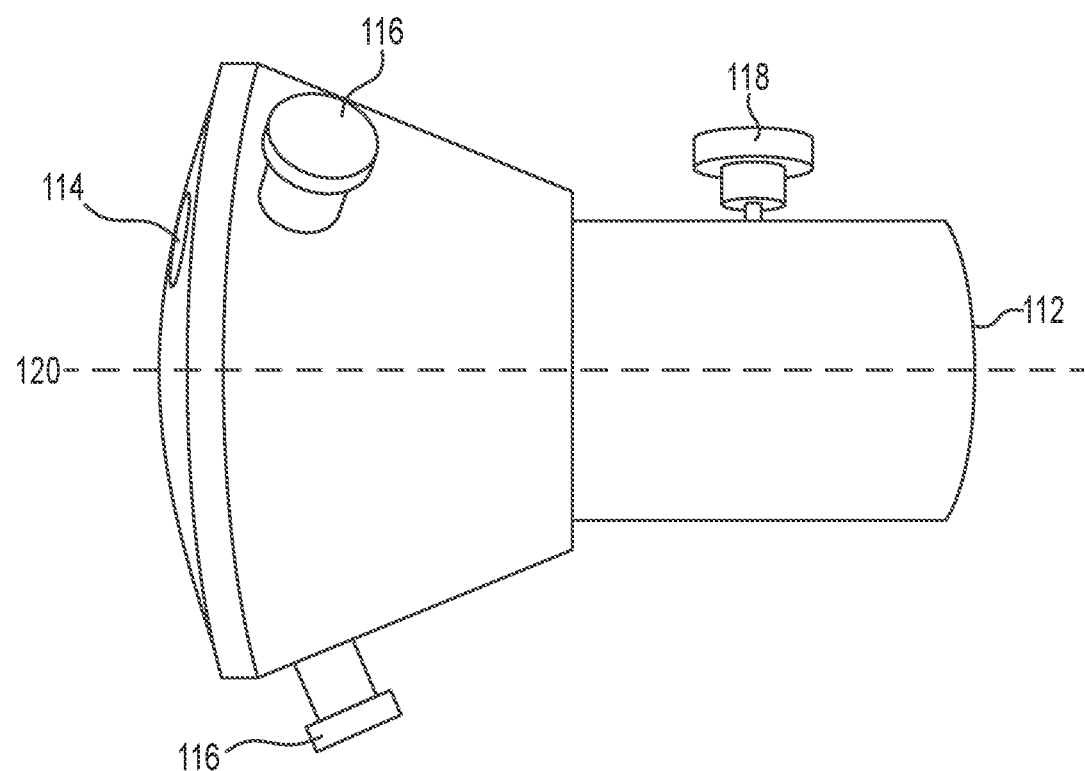
FIG. 5 is a side view thereof.
Figure 6:
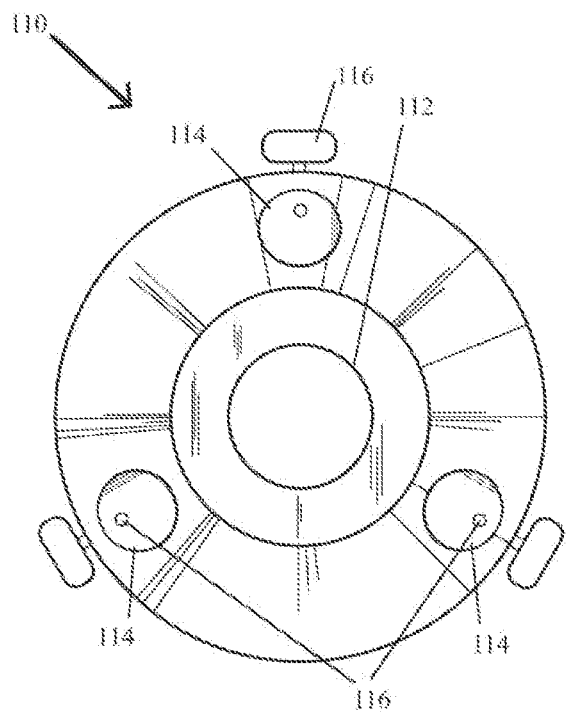
FIG. 6 is a bottom view thereof.

Turning now to FIG. 2, a side view of the control system 100 is shown. The control system 100 may be configured to engage one or more support mechanisms to allow the control system to be stably supported above a ground or other supporting surface. The control system 100 may also be configured to hold a grate or other assembly in an adjustable position below the control system 100. Still further, the control system 100 may be operable to rotate the grate or other assembly. As shown, the control system 100 may include a hub 110, a driveshaft assembly 130, and a support coupling 170. Each of these parts may be discussed in turn.

For example, as shown in FIGS. 3-6, a hub 110 is shown. The hub 110 may be configured to engage one or more support mechanisms. In the case of a tripod support, for example, the hub 110 may be adapted to receive and releasably secure a plurality of legs 5002 by which the cooking apparatus 100 is supported. Still further, the hub 110 may be adapted to securely and/or adjustably support the drive shaft assembly 130 relative to the support mechanism. For example, the hub 110 may provide for vertical adjustment of the driveshaft assembly 130 relative to the heat source 5006 above which the hub 110 may be supported by one or more support mechanisms. The hub 110 may include a generally solid conical, square, round, spherical, rectangular, or other shaped body forming a holding element for a plurality of legs and the drive shaft assembly 130. Alternatively, the hub may be non-solid and may be a frame-type structure. Still other types of hubs may be used. As shown, the hub 110 may include a sleeve 112 and a support mechanism interface.

Figure 7:
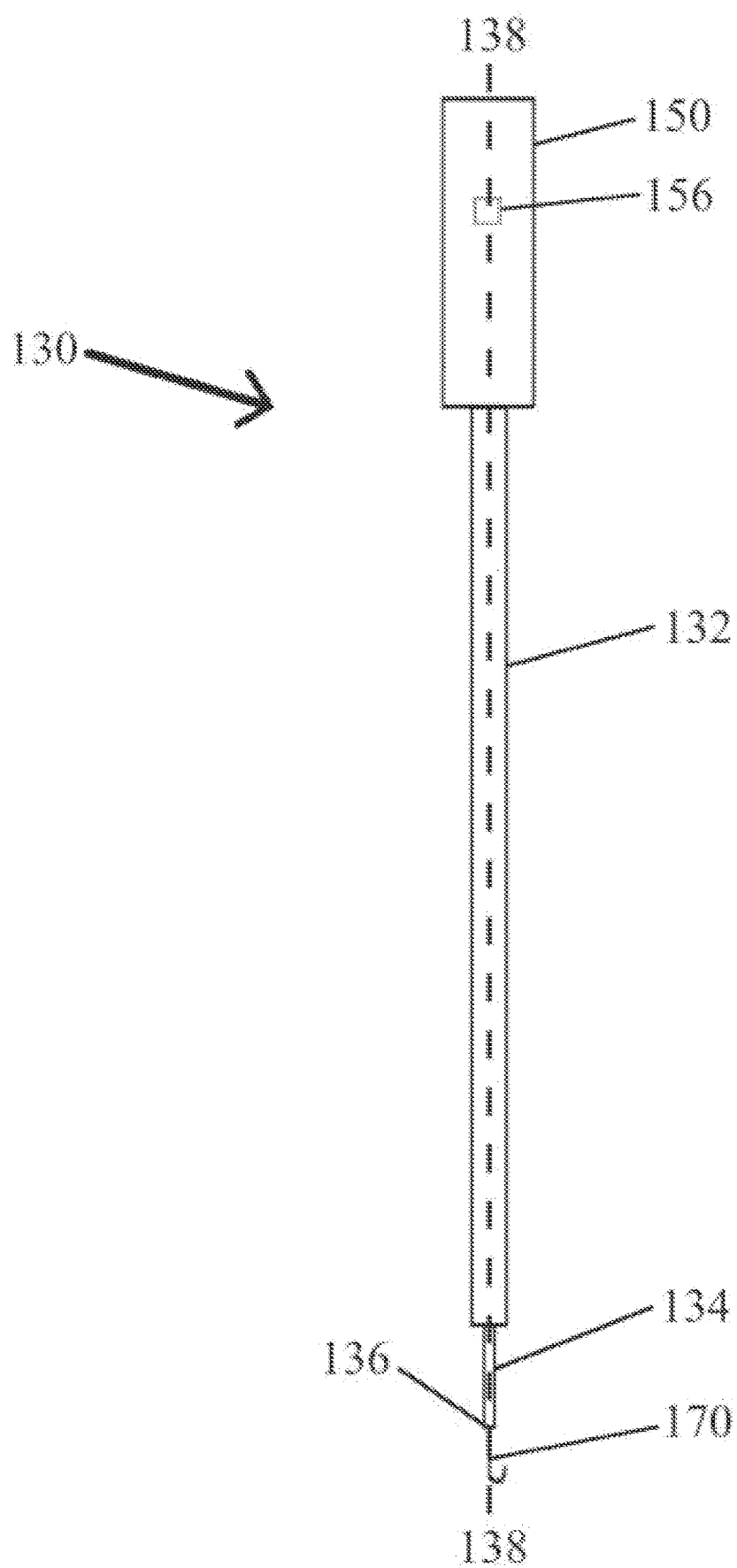
FIG. 7 is a side view of a drive shaft assembly and support coupling of the control system of FIG. 2, according to one or more examples.

The support mechanism interface may be adapted to engage with a support mechanism. In the case of a tripod or legged support mechanism, and as shown in FIG. 7, the support mechanism interface may include plurality of leg couplings 114. The leg couplings 114 may include a plurality of angled bores extending into a bottom side of the hub 110 generally along a central axis of the housing and forming receiving pockets for respective legs of the legged support mechanism. The angled bores may have a longitudinal axis and a depth sufficient to receive a respective leg and resist rotation of the leg about an axis orthogonal to the longitudinal axis of the bore. The bores may have a diameter adapted to receive a leg and, as such, may have a diameter slightly larger than the leg. As shown, the longitudinal axis of each bore may be oriented at an angle from a central axis of the hub ranging from approximately 10 degrees to approximately 35 degrees, or from approximately 15 degrees to approximately 30 degrees, or an angle of approximately 22.5 degrees may be provided. In the case of a generally solid hub, the bores may be drilled or otherwise machined. In the case of a frame-type hub, the bores may include conduits in pipe elements, for example. Still other approaches to formation of the bores may be provided. The leg couplings 114 may also include a leg fastener 116, such as a set screw that may provide for releasably securing legs from the hub. That is, the leg fasteners 116 may extend through hub into the bores of the leg couplings 114 and impinge on legs 5002 positioned in the bores. Securing the legs 5002 may have desirable effects including promoting stability of the assembled cooking apparatus 100 and reducing risk of the legs 5002 decoupling from the hub 110 when the assembled cooking apparatus 100 is lifted, such as to be moved. It is to be appreciated that while a leg-style hub has been described as being adapted to receive leg-style supports, other types of support mechanism interfaces may include brackets, fasteners, or other connections adapted to secure the hub to a support mechanism. That is, for example, a beam, column, archway, or other support mechanism may provide for a rigid support above a clearing and the hub may be adapted to be bolted or otherwise fastened or secured to such support mechanisms.

The sleeve 112 may be adapted to adjustably receive the drive shaft assembly 130. In particular, the sleeve 112 may be adapted to selectively support the drive shaft assembly 130 and allow for generally vertical adjustment of the drive shaft assembly 130 relative to the legs or other support mechanism. In this embodiment, the sleeve 112 of the hub 110 may include a substantially longitudinally extending bore passing through the hub 110. The bore may be arranged along a longitudinal axis 120 of the hub 110 and may have a diameter selected to receive and slidingly couple with the drive shaft assembly 130. For example, the bore may have a diameter that is slightly larger than the drive shaft assembly 130 and, in particular, slightly larger than the axle housing 132. Like the leg couplings, the sleeve may include a fastener for selectively engaging the drive assembly within the bore and securing the position of the drive assembly 130.

In one or more embodiments, a sleeve fastener 118, such as a set screw driven through the outer sleeve 112 of the hub 110 may be provided. The set screw may selectively secure the driveshaft assembly 130 by direct contact with and pressure applied to the driveshaft assembly 130. Selective positioning of the driveshaft assembly 130 within the hub 110 may provide for adjustment of the distance between the support coupling 170 and the heat source 5006. Where the hub is a generally solid element, the sleeve 112 may include a machined bore. Where the hub is a frame-type element, the sleeve 112 may include a conduit in a pipe element, for example. Still other approaches to formation of the bores may be provided. Moreover, while the sleeve 112 is shown to pass through and be aligned with the longitudinal axis 120 of the hub 110, still other approaches to vertical adjustability of the drive shaft 130 may be provided. For example, a laterally extending bracket or arm and bracket may be provided. Moreover, while referred to as a sleeve, a sandwich bracket or other bracket that does not fully encircle the drive shaft assembly 130 may be provided.

Figure 8:
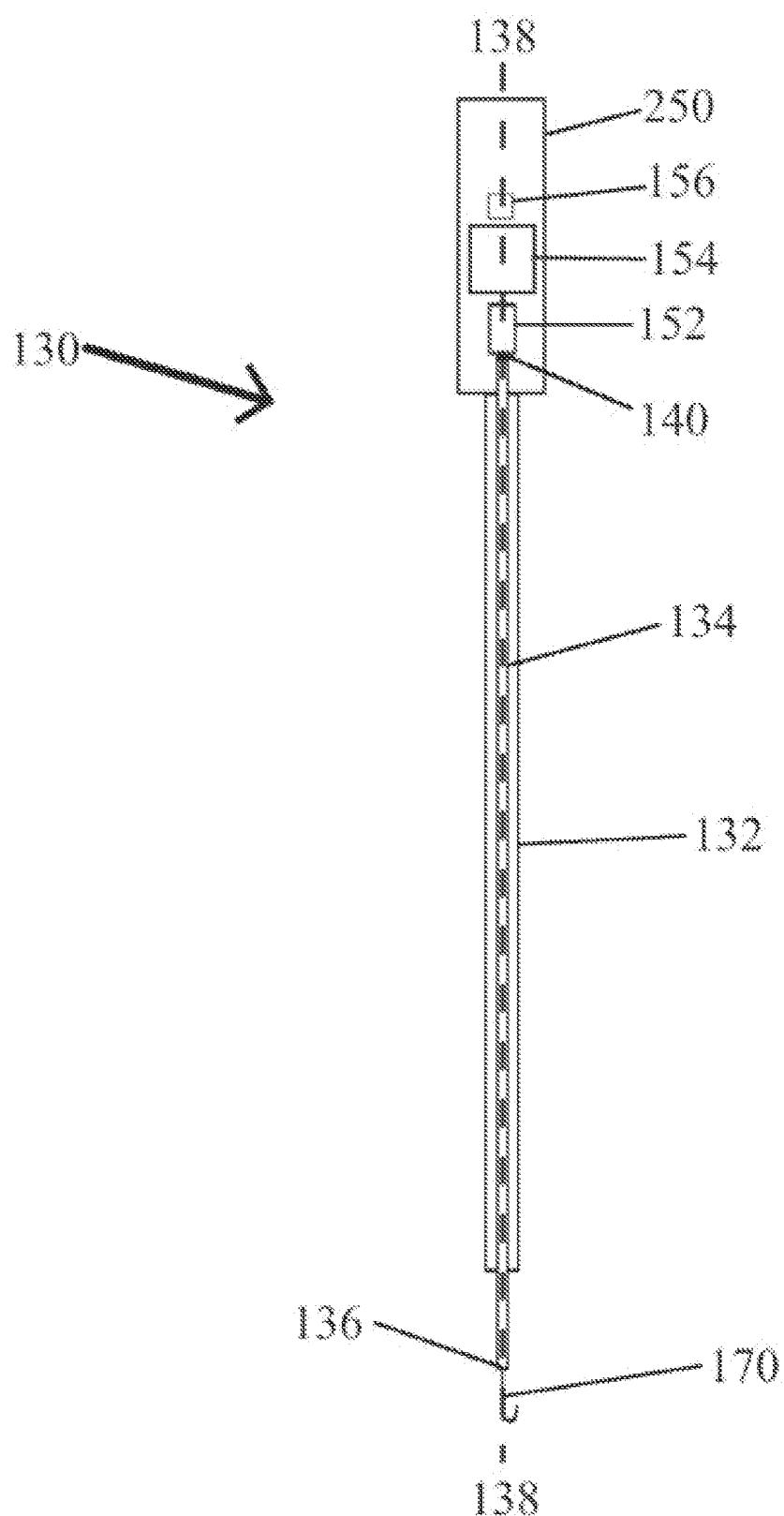
FIG. 8 is a cross-sectional view thereof.

Turning now to the drive shaft assembly 130, reference is made to FIGS. 7-8. The driveshaft assembly 130 may be adapted for engagement by the hub 110 to support and secure the drive shaft assembly 130 and for rotating the support coupling 170 relative to the support structure. In particular, the drive shaft assembly 130 may provide for rotation of the support coupling 170 and, as such, rotation of the food support 5004 over a heat source 5006. In one or more embodiments, the driveshaft assembly 130 may include a power source 154, a motor 152, a motor housing, an axle housing 132, and an axle 134. As shown, the motor housing 150 may be attached to a top end of the axle housing 132, the motor 152 may be mounted in the housing 150, and the axle 134 may be mechanically coupled to the motor 152 and extend through the axle housing 132. That is, the axle 134 may extend from the motor 152 through the axle housing 132, may emerge from a bottom end of the axle housing 132, and may terminate at a free end 136. The support coupling 170 may be attached to the free end 136 of the axle 134. Accordingly, the axle 134 may be rotated about its longitudinal axis 138 when the motor 152 is turned on. This may rotate the support coupling 170 attached to the free end 136 of the axle 134, which may, in turn, provide for rotation of an attached food support 5004 over a heat source 5006, such as an open fire. Each element may be discussed in more detail below.

The axle housing 132 of the driveshaft assembly 130 may be adapted to be received by and slidingly coupled with the sleeve 112 of the hub 110. The axle housing 132 may, thus, allow for gripping contact by the sleeve or its fasteners, while guarding the axle from contact and allowing the axle 134 to spin relatively freely within the axle housing. This engagement of the sleeve 112 with the axle housing 132 may function to support the whole of the drive shaft assembly 130 including portions extending below the hub 110 and portions arranged above the hub 110. This engagement may also allow for adjustment of the height of the driveshaft assembly 130 relative to a heat source 5006 while the driveshaft 134 is rotating or when it is stationary. The axle housing 132 may be a generally elongate conduit with a relatively thick sidewall to receive pressure from the set screw in the sleeve 112 and avoid deformation that might encroach on the operation of the axle 134. In one or more embodiments, the axle housing 132 may be a steel, stainless steel, galvanized metal, steel alloy, titanium, aluminum, or other material pipe, for example. While an axle housing 132 with an annular cross-sectional shape has been described, still other shapes may be provided including triangular, square, rectangular, or another shape providing a hollow operating interior space.

The axle 134 of the driveshaft assembly 130 may be adapted to support the support coupling 170 at a free end thereof and provide rotation to the support coupling 170 without undue wobble or vibration, for example. The axle 134 may extend along its longitudinal axis 138 within the axle housing 132 of the driveshaft assembly 130. In one or more embodiments, the axle 134 may include an elongate rod adapted to fit within the axle housing 132 and to have clearance from the inner wall of the axle housing 132. The rod may include a steel, stainless steel, galvanized metal, steel alloy, titanium, or aluminum rod. In one or more embodiments, the axle 134 may have a circular cross-section or another cross-section may be provided such as square, rectangular, triangular, or other shape. The axle 134 may be supported laterally at one or both ends of the axle housing 132 and/or along the length of the axle housing 132 by a bearing, bushing, or other element adapted to maintain the spacing of the axle 134 from the inner wall of the axle housing 132 and allow the axle 134 to rotate.

Figure 9:
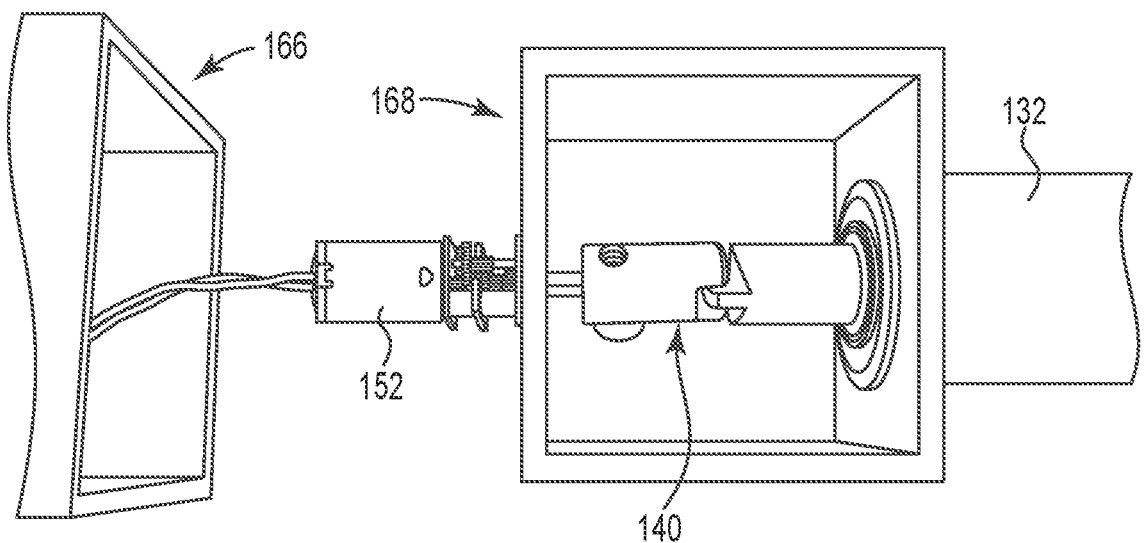
FIG. 9 is a disassembled view of a housing of the drive shaft assembly of FIG. 7.
Figure 10:
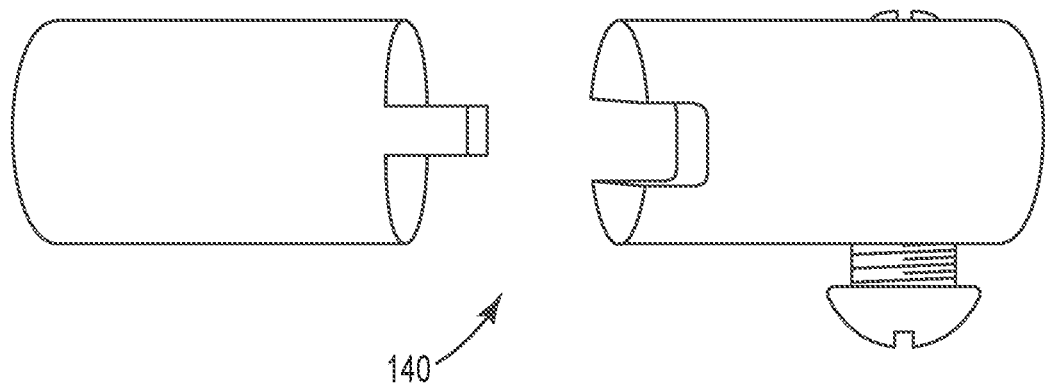
FIG. 10 is a motor coupling of the drive shaft assembly of FIG. 7.
Figure 11:
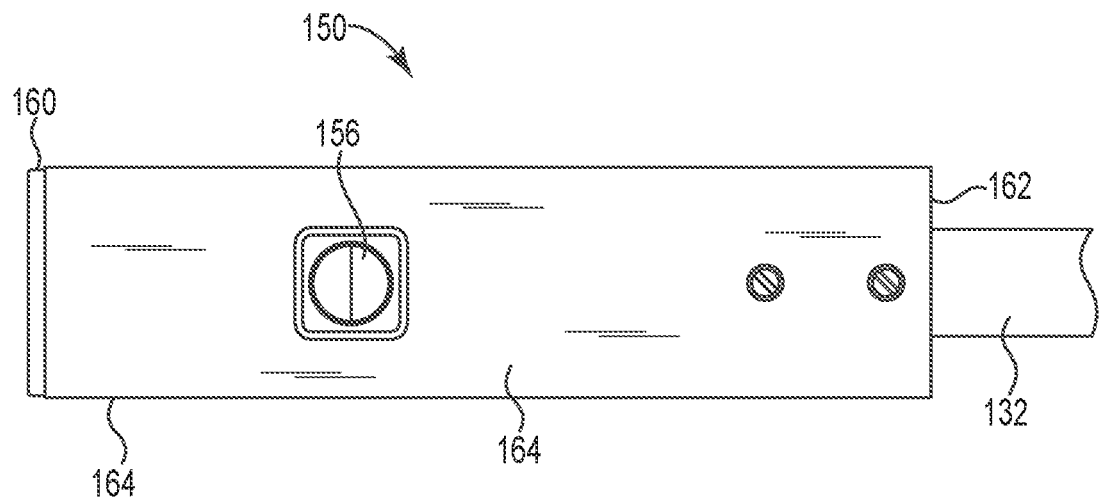
FIG. 11 is a front view of a housing of the drive shaft assembly of FIG. 7.
Figure 12:
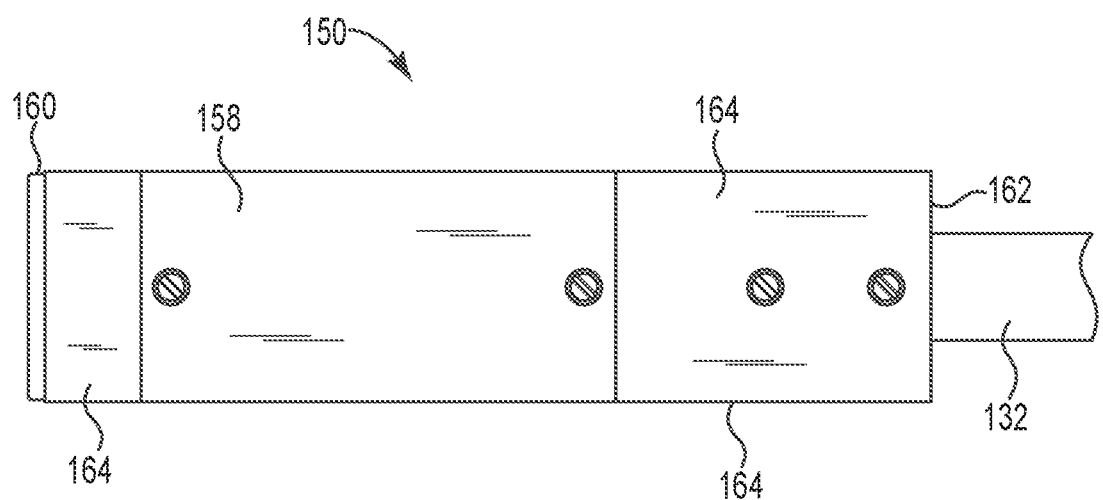
FIG. 12 is a back view thereof.

As shown in FIGS. 9 and 10, the axle 134 may be mechanically coupled to the motor 152 such that operation of the motor 152 causes the axle 134 to rotate. For example, as shown, a coupling 140 in the form of two opposing jaw elements may be provided. Each half of the coupling 140 may be secured to a motor shaft or the axle 134, as the case may be, with a key/keyway connection, set screw, or both, for example. In one or more embodiments, the coupling 140 of the axle 134 and the motor 152 may preferably be accomplished by a resilient mechanical coupling 140 so that if the axle 134 binds or its rotation is otherwise inhibited, the motor 152 may be protected from damage. In this embodiment, the mechanical coupling 140 between the motor 152 and the axle 134 may be a relatively soft material or resilient material so binding or stopping of the axle 134 may provide reduced risk of damage to the motor 152. While a mechanical coupling 140 has been shown, in one or more embodiments, the axle 134 may be directly coupled to the motor by extending into the motor, a selectable or engageable power take-off may be provided, or another type of mechanical coupling may be provided to deliver rotational motion and power from the motor 152 to the axle 134.

FIGS. 9 and 11-13 present an embodiment of the housing 150 of the driveshaft assembly 130. The housing 150 may be adapted to enclose and protect components, including the motor 152 and the power source 154. The housing 150 may be adapted to open, providing for maintenance access to enclosed components, such as for regular maintenance or making repairs. In one or more embodiments, the housing 150 may include a top wall 160, a bottom wall 162, a perimeter wall 164, an actuator 156, an opening 158, an upper shell 166, and a lower shell 168. The housing 150 may be established by a top wall 160, a bottom wall 162, and a perimeter wall 164 extending between the top wall 160 and the bottom wall 162. Components may be mounted inside the housing 150, including the motor 152 and a power source 154, such as a battery. In this embodiment, the housing 150 may enclose the motor 152, the power source 154, and the mechanical coupling 140 connecting the motor 152 and the axle 134. In this embodiment, on an outside surface of the housing 150, such as an outside surface of the top wall 160, the bottom wall 162, or the perimeter wall 164, may be mounted an actuator 156, which may be operationally coupled to the motor 152 for selectively adjusting the operating conditions of the motor 152, such as turning the motor 152 on and off or adjusting the speed of the motor 152.

FIG. 9 presents an embodiment of the housing 150 and illustrates the separation of the upper shell 166 and the lower shell 168. The upper shell 166 and the lower shell 168 may be adapted to separate from each other, providing for maintenance access to components enclosed in the housing 150. In the embodiment presented in FIG. 13, the upper shell 166 may be established by the top wall 160 and the perimeter wall 164 and the lower shell 168 may be established by the bottom wall 162. In this embodiment, the upper shell 166 and the lower shell 168 may separate to provide access to the motor 152 and the mechanical coupling 140.

Figure 13:
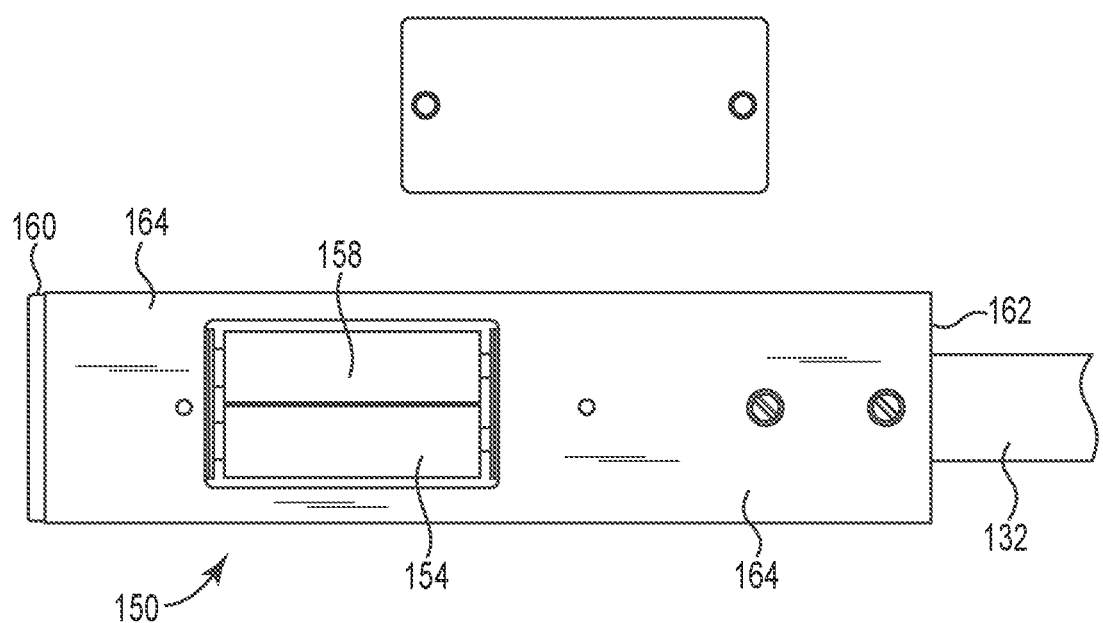
FIG. 13 is a back view thereof with a cover removed.

FIG. 13 presents an embodiment of the housing 150 and illustrates the opening 158. The opening 158 may be adapted to open and may provide access to components enclosed in the housing 150. In the embodiment presented in FIG. 13, the opening 158 may be opened to provide access to the power source 154. In the embodiment presented in FIG. 13, the power source 154 is mounted to an inside surface of the housing 150 and may be accessible by the opening 158. In this embodiment, the power source 154 comprises two AA batteries, which may be inserted, removed, or replaced by accessing the power source 154 through the opening 158.

Figure 14:
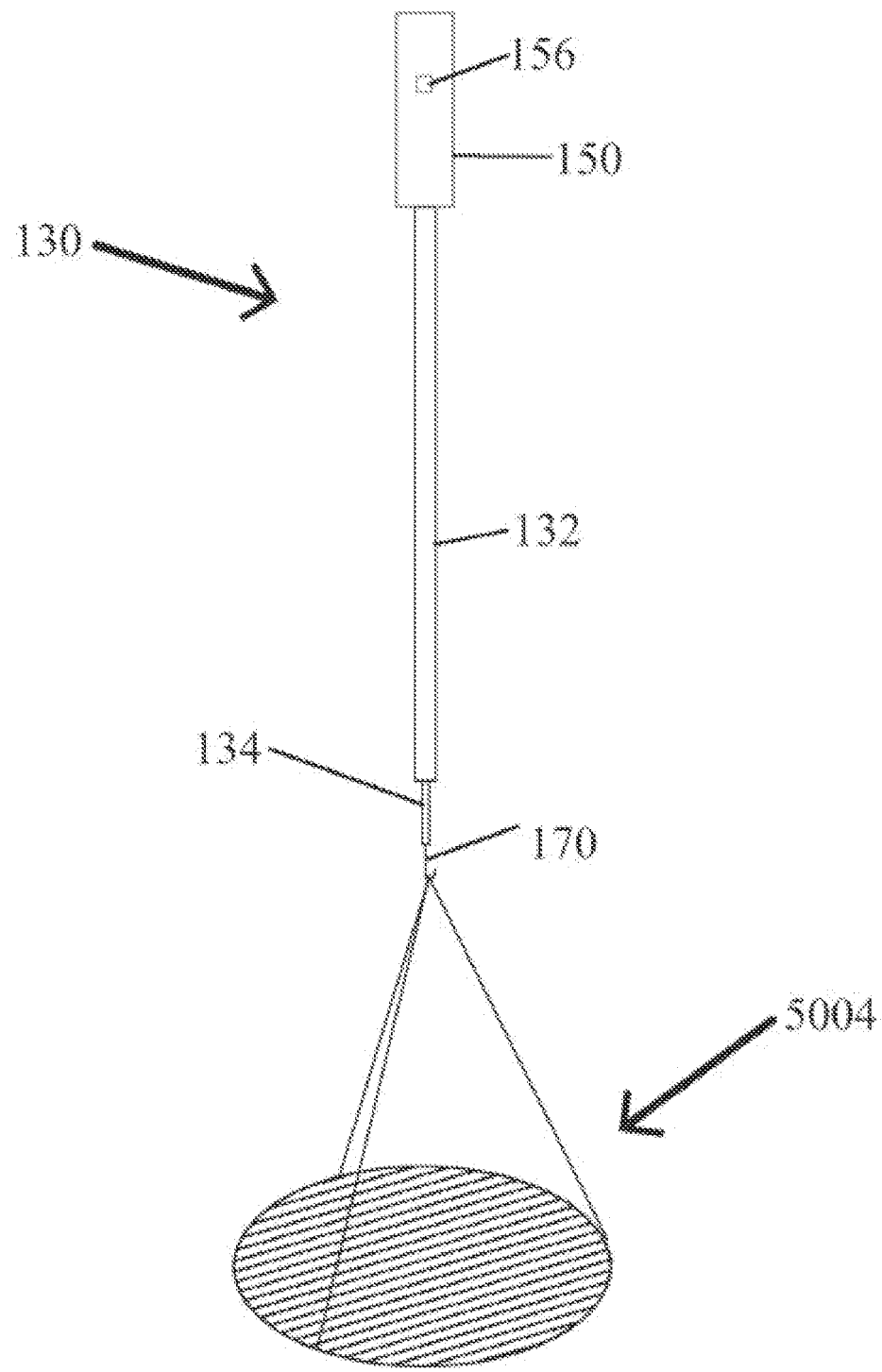
FIG. 14 is a perspective view of a drive shaft assembly and a support coupling, according to one or more examples.
Figure 15:
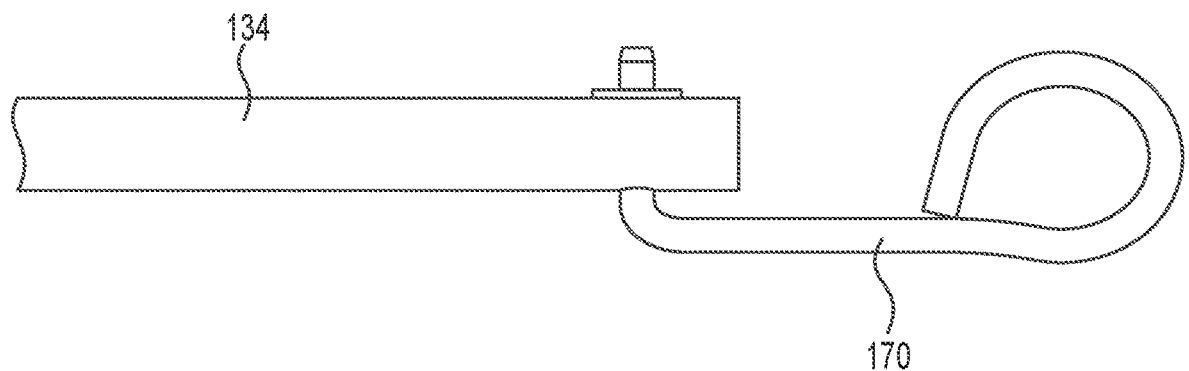
FIG. 15 is a perspective view of a support coupling, according to one or more examples.

FIGS. 14-15 present an example of a support coupling 170. The support coupling 170 may be adapted to releasably couple with a food support 5004 and may provide rotation of a coupled food support 5004 when the motor 152 is turned on and the axle 134 is rotating. In this example, the support coupling 170 is a hook or loop and may be coupled with a food support 5004, such as a grill grate suspended by three equal or similar lengths of chain.

Figure 16:
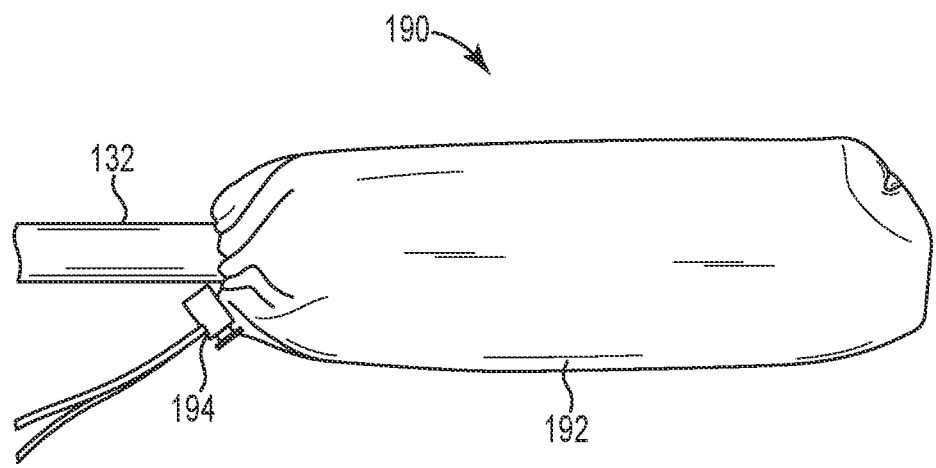
FIG. 16 is a side view of an example waterproof cover.
Figure 17:
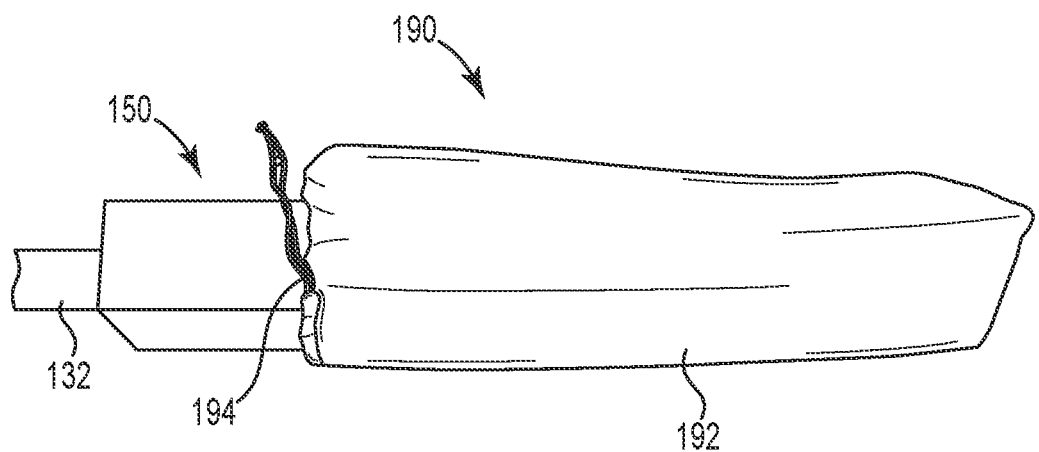
FIG. 17 is a side view of the example waterproof cover of FIG. 16 arranged partially on and partially off the housing of FIG. 11.

FIGS. 16-17 present an embodiment of a housing protection 190. The housing protection 190 may be adapted to protect the housing 150 and components enclosed in the housing 150 from conditions such as wetness. In this embodiment, the housing protection 190 includes a hood 192 comprised of waterproof cloth that may be put over the housing 150 and a drawstring 194 that may be tightened to secure the housing protection 190 in place.

Figure 18:
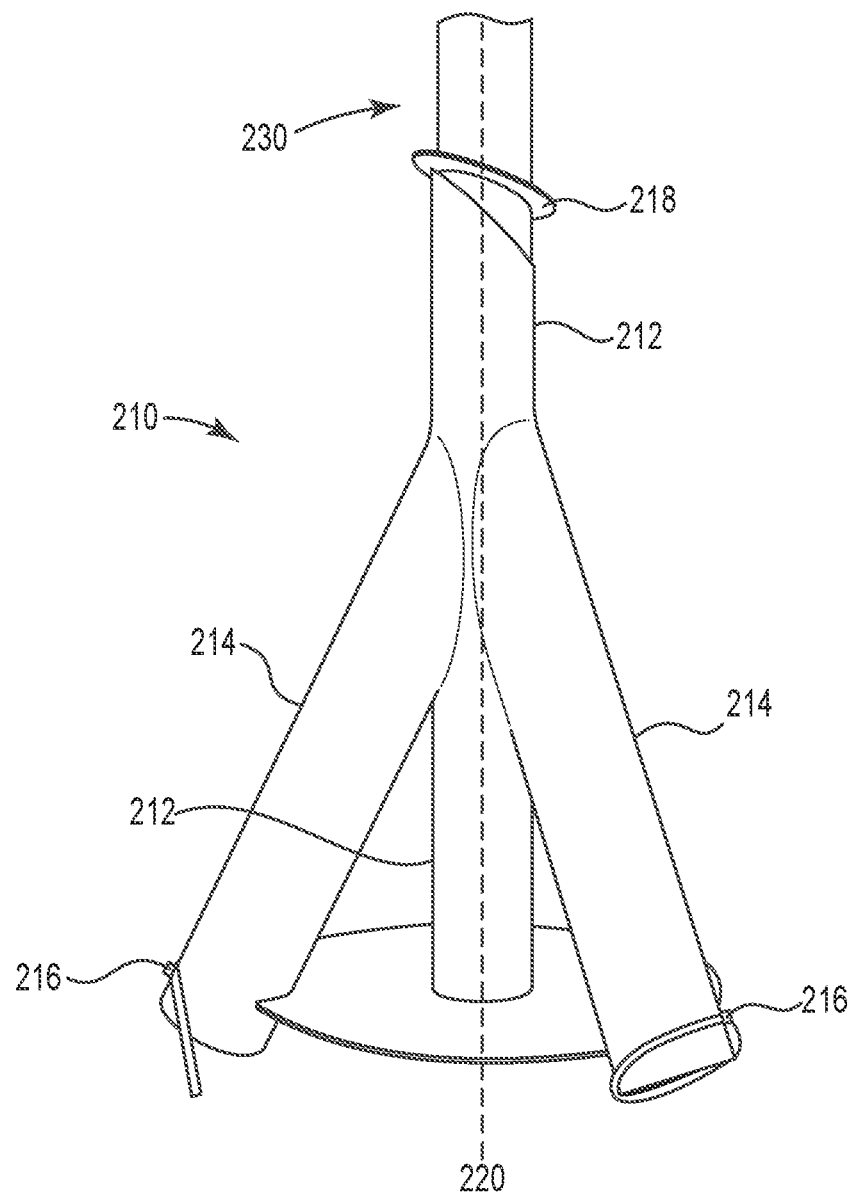
FIG. 18 is a perspective view of a hub of the control system, according to one or more examples.

As mentioned, the hub 110 may be a solid-type hub or a frame-like hub may be provided. FIG. 18 shows an example hub 210 that is similar to the hub 110, but is made up of frame-like elements rather than a solid element, for example. As shown, the hub 210 may include tubing welded together to form an assembly having a sleeve 212 and leg couplings 214. The framework may also include a base for strengthening the framework. One or more embodiments of the hub 210 may be comprised of metal or other suitable materials. Suitable metals may include stainless steel, galvanized steel, titanium, aluminum, or metal alloys. Like the hub 110, the hub 210 may include leg fasteners 216. However, rather than set screws, the leg fasteners may include lock pins or spring balls driven through holes in the leg couplings 214 and into corresponding holes in the legs 5002. However, set screws may be used as well. In this embodiment, the sleeve 212 may receive a driveshaft assembly 230, which may be selectively positioned and secured in place by a sleeve fastener 218, which may include lock pins, spring balls, or a binding washer as shown. In this embodiment, the top of the hub 210 and the central axis 220 of the hub 210 may be nonorthogonal. That is, the top of the hub 210 may, for example, be cut at an angle to establish a point. In this embodiment, the sleeve fastener 218 may comprise a binding washer slidingly coupled with the axle housing of the driveshaft assembly 230 between the housing 250 of the driveshaft assembly 230 and the hub 210. In this embodiment, when the driveshaft assembly 230 is pulled down with respect to the hub 210, such as by gravity, one side of the binding washer may be pushed up by the point of the hub 210 and the opposite side of the binding may be frictionally pulled down by the axle housing 232 of the driveshaft assembly 230, which opposing forces may cause the binding washer to lock the driveshaft assembly 230 in place. The driveshaft assembly 230 may be raised to release the binding washer, which may re-lock as soon as the driveshaft assembly 230 is lowered again. To lower the driveshaft assembly 230 with respect to the hub 210, the binding washer may be held in position substantially orthogonal to the driveshaft assembly 230 while lowering the drive shaft assembly. The binding washer may then be released when the drive shaft 230 is at a desired height.

In one or more embodiments, while a three-leg system has been shown, the hub 110/210 may be supported by two legs, for example by driving the legs into the ground for stability. The hub 110 may be supported by four or more legs. In one or more embodiments, the sleeve fastener 118 for selectively securing the driveshaft assembly 130 in place relative to the hub 110 may be a geared crank attached to the hub 110 and a plurality of ridges attached to the outside surface of the inner sleeve 132 of the driveshaft assembly 130, wherein the geared crank may be operationally coupled with the plurality of ridges such that the crank may be turned to drive the driveshaft assembly 130 up or down.

Figure 19:
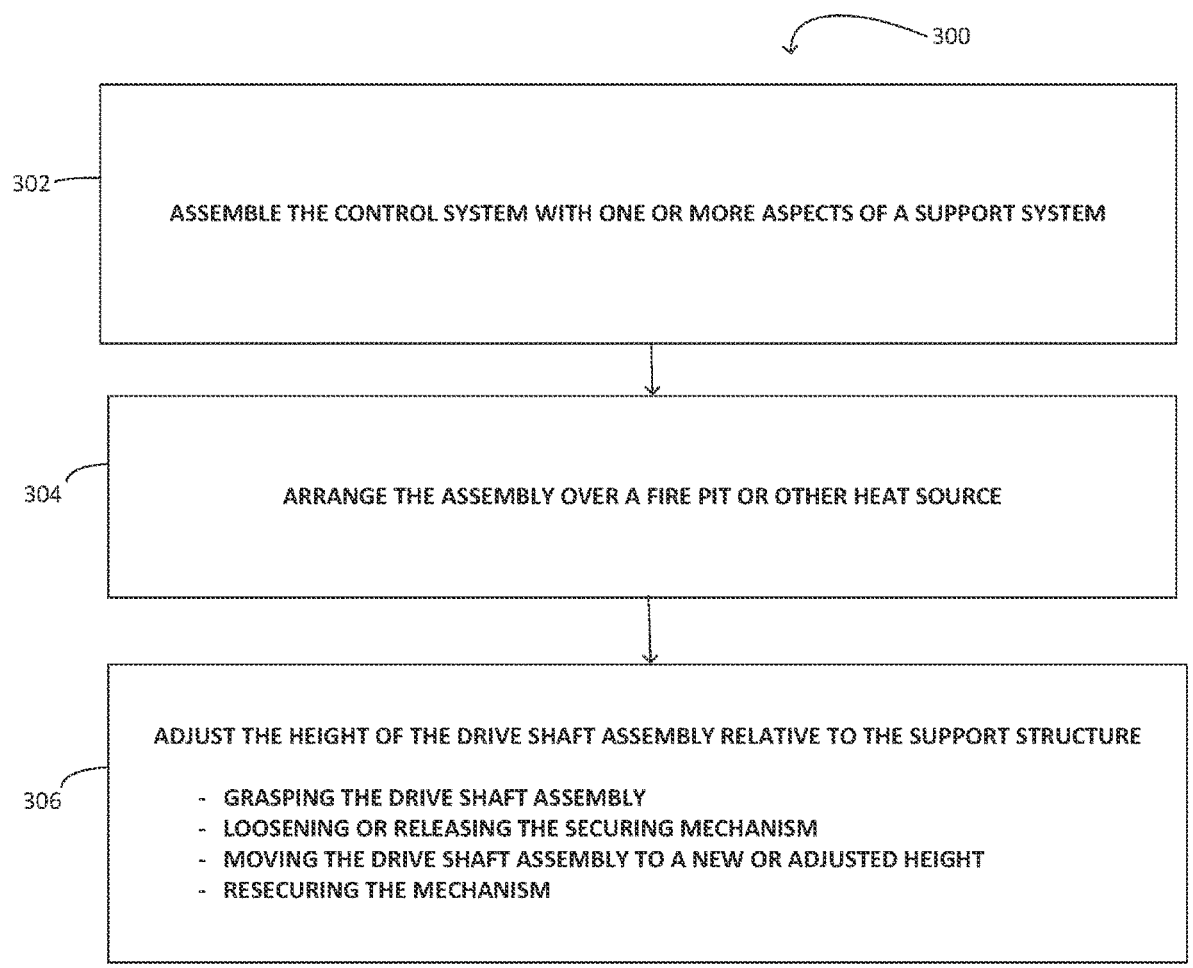
FIG. 19 is a diagram depicting a method of use, according to one or more examples.
Figures 20, 21:
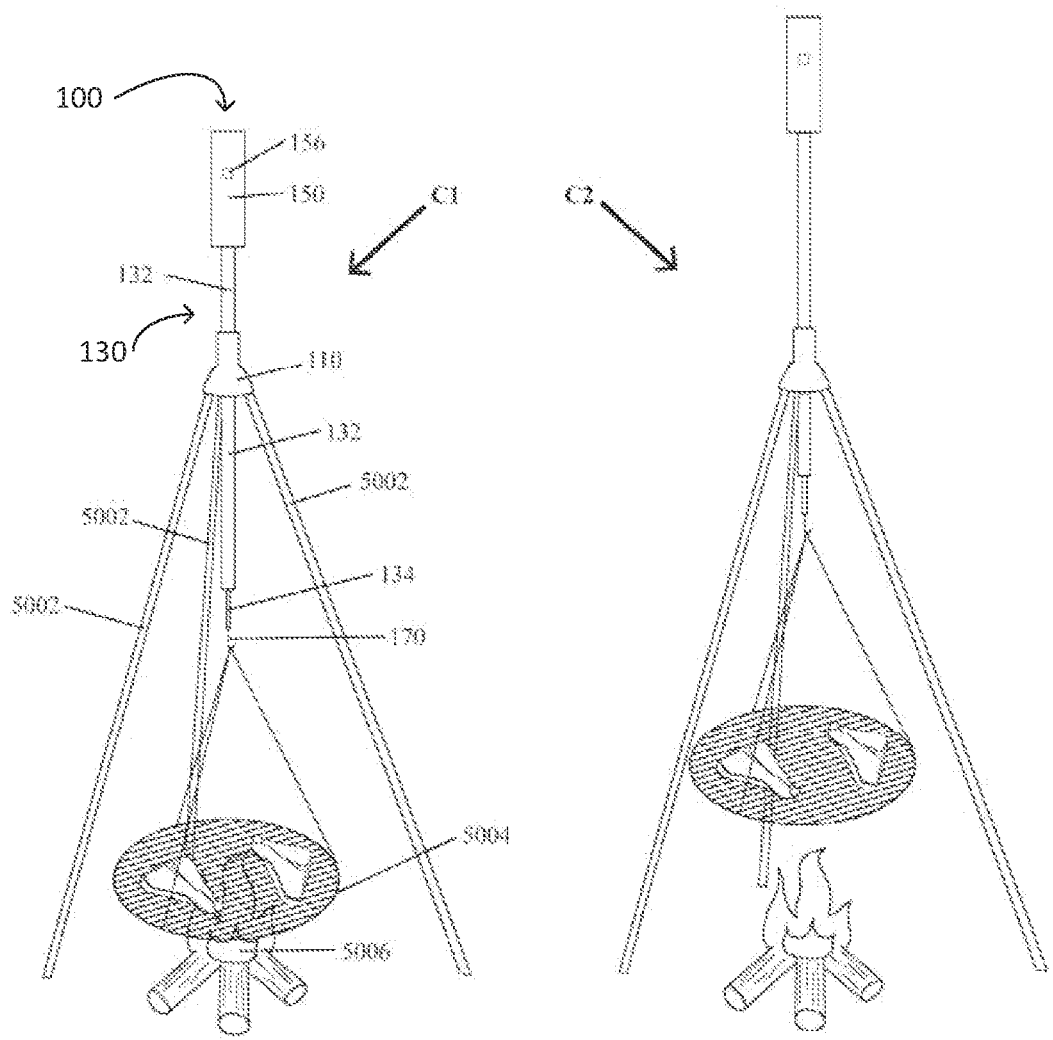
FIG. 20 is a perspective view of the control system assembled with a tripod frame and adjusted with the support coupling relatively close to a heat source.
FIG. 21 is a perspective view of the control system assembled with a tripod frame and adjusted with the support coupling relatively far from a heat source.

In operation and use, and with reference to FIG. 19, a method 300 of use may be provided. In the method 300, the control system described above may be assembled with one or more aspects of a support system. 302. For example, one or more legs may be inserted into the bores of the hub 110/210 and secured thereto with fasteners such as set screws, spring balls, and the like. The drive shaft assembly may also be placed in the hub by sliding the axle housing through the hub and securing the position of the drive shaft assembly with a set screw, binding ring, or other securing mechanism. The assembled apparatus may be arranged over a fire pit and may be used to control the height and rotation of food, water, or other matter that is suspended from the support coupling 170. 304. For example, a grate may be suspended from the support coupling 170 and food may be placed on the grate. When a fire in the fire pit is present and desirable cooking temperatures are achieved, the drive shaft assembly may be adjusted in height to suitably position the grate in relatively close proximity to the fire. In addition, the motor of the drive shaft assembly may be switched on causing the support coupling and the supported grate to rotate and more evenly cook the food. As shown by comparing FIGS. 21 and 22, where the cooking temperature of the food is too hot or too cold or cooking is complete, the height of the drive shaft assembly may be adjusted by grasping the drive shaft assembly, loosening or releasing the securing mechanism, moving the drive shaft assembly to a new or adjusted height, and resecuring the securing mechanism. 306. This may be done while the motor remains on and the support coupling continues to rotate or this may be performed with the motor turned off. In one or more embodiments, the user may grasp the drive shaft assembly above the hub where the drive shaft assembly is cooler rather than grasp the drive assembly below the hub. Position C1 and C2 illustrate two example heights to which the food support 5004 may be positioned over the heat source 5006. In some embodiments, position C1 may be used when positioning the example cooking apparatus over a smaller heat source 5006 while position C2 may be used when positioning the example cooking apparatus 100 over a larger heat source 5006. In some embodiments, position C1 may be used when high heat is desirable, such as when searing steaks, while position C2 may be used when less heat is desirable, such as when finishing steaks or when cooking stew.

While a heat source such as an open fire has been described, other examples of heat sources 5006 may include a bed of coals, an electric burner, or a propane burner. Moreover, while a grill grate has been described for supporting food, other examples of items that may be supported by the support coupling include a Dutch oven, a tea kettle, a percolator, a skillet, a sauce pan, or a platform. In any case, rotation of the food support 5004 over the heat source 5006 has the desirable effect of promoting even cooking. When cooking over a heat source 5006, especially heat sources such as an open fire or a bed of coals, the heat provided may be highly variable with certain spots above the heat source 5006 exposed to much higher temperatures than other spots. Such thermal hot spots may cause uneven cooking with food over the thermal hot spot cooking faster than the rest of the food. Rotation of the food support 5004 and food thereon over the heat source 5006 may promote even cooking by providing more consistent exposure the food to any thermal hot spots.

Moreover, the position of the hub relative to the heat source may be advantageous. That is, the hub 110/210 may be farther from the heat source 5006 than the food support 5004. Being farther from the heat source 5006 than the food support 5004, the hub 110 and the driveshaft assembly 130 may be less likely to be exposed to extreme temperatures and, therefore, less likely to reach extreme temperatures capable of causing injury upon direct contact with exposed skin. Adjustment of the height of the food support 5004 by user interaction with the hub 110 and the driveshaft assembly 130 and without need for user interaction with the food support 5004 and other components exposed to extreme temperatures may have desirable effects including reducing risk of burns to the user and eliminating the need for temperature-resistant hand protection when adjusting the height of the food support 5004. Further, as illustrated by FIG. 2, the cooking apparatus 100 may be adapted to permit adjustment of the height of the food support 5004 while the cooking apparatus 100 is turned on and the food support 5004 is rotating.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A control system for use with an outdoor cooking apparatus comprising:
    a hub comprising:
        a sleeve; and
        a support mechanism interface configured to secure the hub to a support mechanism;
    an axle housing adapted to slidably couple with the sleeve, the axle housing having an upper end and a lower end;
    a motor mounted at or near the upper end of the axle housing;
    an axle mechanically coupled to the motor and extending through the axle housing to a free end emerging from the lower end of the axle housing; and a support coupling attached to the free end of the axle, the support coupling being adapted to support a food support below the axle housing;

wherein:
the axle housing is selectively arranged and secured relative to the sleeve to position the height of the support coupling relative to the lower end of the axle housing; and
the axle rotates about its longitudinal axis when the motor is turned on.

2. The control system of claim 1, further comprising an actuator operably coupled to the motor for selectively adjusting the operating conditions of the motor.

3. The control system of claim 1, wherein the support mechanism interface comprises a plurality of leg couplings.

4. The control system of claim 3, wherein the leg couplings comprise bores extending into the hub and adapted to receive respective support legs.

5. The control system of claim 4, wherein the leg couplings each further comprise a leg fastener adapted to releasably secure a respective leg coupling.

6. The control system of claim 1, where the sleeve further comprises a sleeve fastener adapted to releasably secure the axle housing within the sleeve.

7. The control system of claim 6, wherein the sleeve fastener is a set screw.

8. The control system of claim 6, wherein the sleeve fastener is a binding ring.

9. The control system of claim 6, wherein the sleeve fastener is a crank.

10. The control system of claim 1, wherein selectively arranging and securing the axle housing in the sleeve can be performed while the motor is running.

11. The control system of claim 1, wherein the sleeve further comprises a sleeve fastener adapted to releasably secure the axle housing within the sleeve.

12. The control system of claim 11, wherein the sleeve fastener is a set screw.

13. The control system of claim 11, wherein the sleeve fastener is a binding ring.

14. The control system of claim 11, wherein the sleeve fastener is a crank.

15. A cooking apparatus, comprising:
a plurality of legs;
a food support suspended from the plurality of legs by a control system; and
a control system, the controls system comprising:
a hub comprising:
a sleeve; and
a support mechanism interface configured to secure the hub to a support mechanism;
an axle housing adapted to slidably couple with the sleeve, the axle housing having an upper end and a lower end;
a motor mounted at or near the upper end of the axle housing;
an axle mechanically coupled to the motor and extending through the axle housing to a free end emerging from the lower end of the axle housing; and
a support coupling attached to the free end of the axle, the support coupling being adapted to support a food support below the axle housing;
wherein:
the axle housing is selectively arranged and secured relative to the sleeve to position the height of the support coupling relative to the lower end of the axle housing; and
the axle rotates about its longitudinal axis when the motor is turning on.

16. The control system of claim 15, wherein the support mechanism interface comprises a plurality of leg couplings.

17. The control system of claim 16, wherein the leg coupling comprise bores extending into the hub and adapted to receive one of the plurality of legs.

18. The control system of claim 17, wherein the leg couplings each further comprise a leg fastener adapted to releasably secure a respective leg in a respective leg coupling.

\* \* \* \* \*